United States Patent
Koller et al.

(10) Patent No.: US 11,718,309 B2
(45) Date of Patent: Aug. 8, 2023

(54) METHOD FOR OPERATING AN AUTONOMOUSLY DRIVING VEHICLE

(71) Applicant: DAIMLER AG, Stuttgart (DE)

(72) Inventors: Micha Koller, Pliezhausen (DE);
Hubert Rehborn, Sindelfingen (DE);
Frank Starman, Boeblingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 329 days.

(21) Appl. No.: 17/266,331

(22) PCT Filed: Jul. 12, 2019

(86) PCT No.: PCT/EP2019/068910
§ 371 (c)(1),
(2) Date: Feb. 5, 2021

(87) PCT Pub. No.: WO2020/030380
PCT Pub. Date: Feb. 13, 2020

(65) Prior Publication Data
US 2021/0309238 A1     Oct. 7, 2021

(30) Foreign Application Priority Data
Aug. 8, 2018   (DE) .................... 10 2018 006 282.2

(51) Int. Cl.
*B60W 50/038*    (2012.01)
*B60W 50/00*     (2006.01)
(Continued)

(52) U.S. Cl.
CPC ...... *B60W 50/038* (2013.01); *B60W 50/0097* (2013.01); *B60W 50/029* (2013.01);
(Continued)

(58) Field of Classification Search
CPC .......... B60W 50/038; B60W 50/0097; B60W 50/029; B60W 50/14; B60W 60/0059;
(Continued)

(56) References Cited

U.S. PATENT DOCUMENTS

| | | |
|---|---|---|
| 9,298,184 B2 | 3/2016 | Bartels et al. |
| 10,661,798 B2 | 5/2020 | Hermann et al. |

(Continued)

FOREIGN PATENT DOCUMENTS

| | | | | |
|---|---|---|---|---|
| CA | 2770918 A1 | * | 9/2012 | ............. B66F 9/063 |
| DE | 102013222048 A1 | | 4/2015 | |

(Continued)

OTHER PUBLICATIONS

Joshua et al., "Experimental Characterization of Space Optical Communications With Disruption-Tolerant Network Protocols," 2011, Publisher: IEEE.*

(Continued)

*Primary Examiner* — Tuan C To
(74) *Attorney, Agent, or Firm* — Patent Portfolio Builders PLLC

(57) ABSTRACT

A method for operating an autonomously driving vehicle that is connected to a central computer unit via a communication connection for exchanging data. During the autonomous driving mode, a request to take over a driving task is emitted to a vehicle user when at least one takeover condition is fulfilled. The takeover condition is fulfilled when it is established that the communication connection to the central computer unit is disrupted on a route portion that exceeds a predetermined length and on which the vehicle is located or which the vehicle is approaching.

10 Claims, 1 Drawing Sheet

(51) Int. Cl.
*B60W 60/00* (2020.01)
*B60W 50/029* (2012.01)
*B60W 50/14* (2020.01)
*G05D 1/00* (2006.01)
*H04L 67/12* (2022.01)
*B60W 50/02* (2012.01)

(52) U.S. Cl.
CPC ........ *B60W 50/14* (2013.01); *B60W 60/0053* (2020.02); *B60W 60/0059* (2020.02); *G05D 1/0061* (2013.01); *H04L 67/12* (2013.01); *B60W 2050/021* (2013.01); *B60W 2050/0295* (2013.01); *B60W 2050/146* (2013.01); *B60W 2556/45* (2020.02); *B60W 2720/10* (2013.01)

(58) Field of Classification Search
CPC ......... B60W 60/0053; B60W 2556/45; B60W 2050/021; B60W 2050/0295; B60W 2050/146; B60W 2720/10; G05D 1/0061; H04L 67/12
USPC .......................................................... 701/24
See application file for complete search history.

(56) References Cited

U.S. PATENT DOCUMENTS

| | | | |
|---|---|---|---|
| 2013/0211656 A1* | 8/2013 | An .................... | B62D 15/027 701/25 |
| 2015/0051778 A1* | 2/2015 | Mueller ............... | B60W 10/06 701/29.2 |
| 2015/0051780 A1* | 2/2015 | Hahne .................. | B60W 10/04 701/23 |
| 2017/0305420 A1 | 10/2017 | Desens et al. | |
| 2017/0309086 A1* | 10/2017 | Zhai .................... | A61B 5/0013 |
| 2018/0136651 A1 | 5/2018 | Levinson et al. | |
| 2018/0173227 A1* | 6/2018 | Mukai .................. | B60W 50/14 |
| 2019/0009797 A1* | 1/2019 | Liu ..................... | B60W 50/029 |
| 2019/0184898 A1* | 6/2019 | Zheng .................. | B60Q 9/00 |
| 2019/0382004 A1* | 12/2019 | Golov ................. | B60W 60/001 |
| 2020/0012276 A1* | 1/2020 | Dochow ............ | B60W 60/0053 |
| 2020/0017124 A1* | 1/2020 | Camhi ................. | G06N 20/00 |
| 2020/0039535 A1* | 2/2020 | Marberger ............ | B60W 30/12 |
| 2021/0046952 A1* | 2/2021 | Ju ....................... | B60W 50/029 |
| 2021/0179122 A1* | 6/2021 | Zhu ..................... | B60W 10/18 |
| 2022/0396291 A1* | 12/2022 | Kerschbaum ......... | B60W 50/14 |

FOREIGN PATENT DOCUMENTS

| | | | |
|---|---|---|---|
| DE | 102014013672 A1 | 4/2015 | |
| DE | 102014014120 A1 | 4/2015 | |
| DE | 102015014139 A1 | 5/2017 | |
| DE | 102017009510 A1 | 3/2018 | |
| EP | 2921362 A1 | 9/2015 | |
| EP | 2921363 A1 | 9/2015 | |
| EP | 2979914 A2 * | 2/2016 | ............. B60K 28/06 |
| EP | 3779514 A1 * | 2/2021 | ........... B60R 16/023 |
| WO | WO-2016092796 A1 * | 6/2016 | ........... B60K 28/066 |

OTHER PUBLICATIONS

Ki et al., "The user interface based on Electromyography analysis to takeover Driving mode in autonomous vehicle," 2016, Publisher: IEEE.*
International Search Report dated Oct. 18, 2019 in related/corresponding International Application No. PCT/EP2019/068910.
Office Action created on Jun. 4, 2019 in related/corresponding DE Application No. 10 2018 006 282.2.
Written Opinion dated Oct. 18, 2019 in related/corresponding International Application No. PCT/EP2019/068910.

* cited by examiner

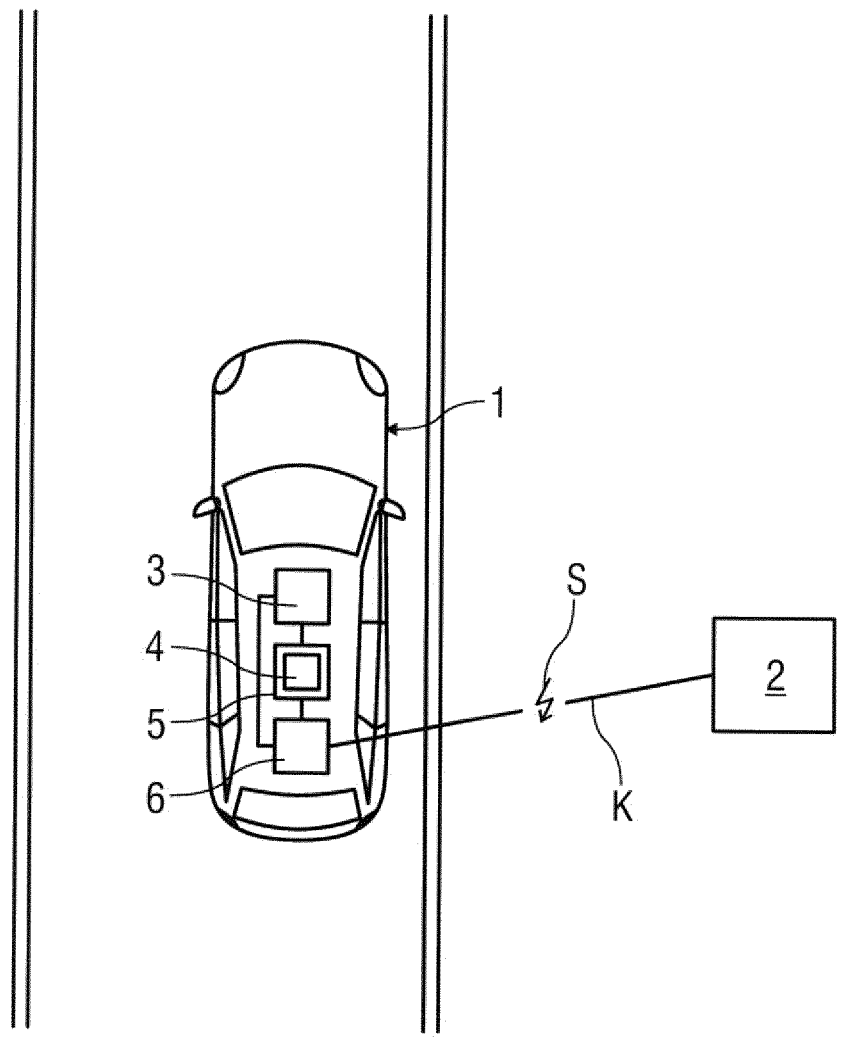

METHOD FOR OPERATING AN AUTONOMOUSLY DRIVING VEHICLE

BACKGROUND AND SUMMARY OF THE INVENTION

Exemplary embodiments of the invention relate to a method for operating an autonomously driving vehicle, which is connected to a central computer unit for exchanging data via a communication connection, wherein, during the autonomous driving mode, a request to take over a driving task is emitted to a vehicle user when at least one takeover condition is fulfilled.

DE 10 2015 014 139 A1 discloses a method for operating a distance and speed regulating function of a vehicle and a driver assistance system for carrying out the method. The vehicle is an autonomously or highly automatically driving vehicle, wherein at least one measure to increase driving safety is introduced when the driver is inattentive and when at least one predetermined condition is fulfilled. The predetermined conditions are that the measure to increase driving safety is introduced when the vehicle approaches a location that is critical in terms of the routing or is at such a location, the vehicle approaches a location with traffic disruptions or is at such a location, the vehicle approaches a location with visibility impairment or is at such a location, the vehicle is accelerated by the distance and speed regulating function or an anomaly of the traffic flow is present in the vehicle surroundings.

Moreover, DE 10 2017 009 510 A1 describes a method for updating a digital map in a vehicle. Here, areas without network coverage are ascertained by means of a network coverage map, stored inside the vehicle, of a mobile radio supplier. Furthermore, an amount is variably controlled via a mobile radio connection by a central storage unit of downloaded map data at a vehicle position depending on a network coverage stored in the network coverage map for this position of the vehicle and/or on a data transfer rate.

In addition, DE 10 2014 014 120 A1 discloses a method for autonomously operating a vehicle on a driving route lying ahead. The method provides that the autonomous driving mode of the vehicle is only approved when one or a group of predetermined conditions is/are fulfilled for a predetermined route length of the driving route lying ahead. The predetermined conditions are that a structural separation is present on at least one side of a current driving road of the vehicle, a driving track of the vehicle has a minimum track width, no summits or valleys substantially limiting the range of surroundings detection sensors are present, the number of driving tracks does not change, no tunnels are present, no buildings on the driving road are present, no motorway interchange is present, a curvature radius of the driving track of the vehicle is greater than a predetermined threshold value, no traffic disruption is present, no traffic announcement about dangerous situations is present and no traffic announcement about the presence of roadworks is present.

Exemplary embodiments of the invention are directed to an improved method for operating an autonomously driving vehicle compared to the prior art.

A method for operating an autonomously driving vehicle that is connected to a central computer unit via a communication connection for exchanging data provides that, during the autonomous driving mode, a request to take over a driving task is emitted to a vehicle user when at least one takeover condition is fulfilled. According to the invention, the takeover condition is fulfilled when it is established that the communication connection to the central computer unit is disrupted on a route portion that exceeds a predetermined length and on which the vehicle is located or which the vehicle is approaching.

By using the method, the traffic safety can be increased since, if a current and/or imminent disruption of the communication connection is detected, the request to take over the driving task is emitted. The driving task is then carried out by the vehicle user, wherein retrievable information from the central computer unit is not necessarily required for this.

If the vehicle user does not react to the request to take over the driving task, it is automatically arranged for the vehicle in the autonomous driving mode to be brought to a safe standstill, for example on a hard shoulder of a road the vehicle is driving on.

In an embodiment of the method, an activation of the autonomous driving mode is only approved when the vehicle is on a route portion on which the communication connection to the central computer unit is not disrupted for a predetermined minimum length of the route portion. Thus, it can be ensured to the greatest extent that an exchange of necessary information between the vehicle and the central computer unit, in particular for the autonomous driving mode of the vehicle, is possible.

A further embodiment provides that the autonomous driving mode is continued with an amended operating parameter of the vehicle when the length of the route portion, on which the communication connection is disrupted, does not meet the predetermined length. Thus, the vehicle can be shifted into a safety mode until the communication connection between the vehicle and the central computer unit is once again not disrupted.

As the operating parameters, a maximum driving speed, a safe spacing to be observed, and/or a specification for approving at least one driving maneuver, for example, is/are changed, whereby the vehicle is operated in the safety mode until the communication connection between the vehicle and the central computer unit is recreated.

In a development of the method, a spatial-temporal disruption of the communication connection is ascertained by analyzing request behavior of vehicles to the central computer unit. Thus, the ascertainment is based on real data, such that the safety in relation to the disruption of the communication connection is comparatively high.

To ensure a convincing prognosis in relation to a disruption of the communication connection, the locations and times at which requests by these vehicles to the central computer unit have reached the central computer unit are evaluated for a plurality of vehicles. Thus, a route portion can be ascertained on which a reachability and thus an undisrupted communication connection between vehicles and the central computer unit is present in order to operate the vehicle in the autonomous driving mode.

In a possible further embodiment of the method, the type and extent of the spatial-temporal disruption of the communication connection are transmitted to the autonomously driving vehicle before the vehicle has reached the location of the disruption of the communication connection. Thus, the driver is given the opportunity to prepare for the autonomous driving mode ending soon and for them to take over the driving task.

Before reaching the location of the spatial-temporal disruption of the communication connection, in a possible development, at least temporally applicable limitations to the driving mode of the vehicle at the location are transmitted to the vehicle. Thus, the limitations, such as a diesel vehicle ban, for example, are received by the vehicle, such that the vehicle and/or the vehicle driver can correspondingly react.

In order to inform a vehicle user of a current and/or imminent disruption of the communication connection to the central computer unit, the method provides informing the vehicle user in good time.

To do so, it can be provided in an embodiment that the information of the current and/or imminent disruption is emitted at least on a display unit of a navigation system of the vehicle, for example superimposing the corresponding route portion in a signal color.

Exemplary embodiments of the invention are explained in more detail below by means of a drawing.

BRIEF DESCRIPTION OF THE DRAWING FIGURE

Here are shown:
FIG. 1, schematically, a vehicle on a road and a central computer unit.

DETAILED DESCRIPTION

FIG. 1 depicts a vehicle 1 on a road and a central computer unit 2 in a very simplified manner.

The vehicle 1 has an assistance system 3, by means of which the vehicle 1 can be moved in the autonomous driving mode, wherein a vehicle user substantially completely transfers their driving task to the assistance system 3.

In addition, the vehicle 1 has a position determination unit 4 by means of which a current position of the vehicle 1 on a route portion can be ascertained. According to the present exemplary embodiment, the position determination unit 4 is integrated in a navigation system 5 of the vehicle 1.

Furthermore, the vehicle 1 comprises a communication unit 6 which is connected to the central computer unit 2 via a communication connection K. A data exchange, in particular an information exchange, between the vehicle 1 and the central computer unit 2 and vice-versa takes place via this communication connection K.

The autonomously driving vehicle 1 is dependent on various pieces of information from its surroundings in order to be able to achieve a safe and risk-free autonomous driving mode.

On one hand, this information is provided by a sensor system on the side of the vehicle (not depicted in more detail) and, on the other hand, via the data exchange with further vehicles not shown and/or the central computer unit 2.

Some services that are provided to the vehicle 1, for example by means of the central computer unit 2, carry out cyclical prompts, such as in relation to current traffic information, for example.

The communication connection K based on a mobile radio network is substantially extensively available, wherein occasionally so-called dead zones occur or there is no network coverage.

Detecting and charting, i.e., plotting on a map, disruptions S of the communication connection K, in particular in the form of dead zones and lacking network coverage, has proved to be useful, wherein the disruptions S of the communication connection K as communication limitations are not only dependent on a location but also on a number and the behavior of users of the communication connection K within a radio cell and are thus time dependent. In particular for an autonomously driving vehicle 1 that obtains information about communication networks, such as a mobile radio network, for example, it is possibly required in relation to safety that the vehicle 1 is informed about a communication limitation in the form of a disruption S of the communication connection K between the vehicle 1 and the central computer unit 2 on the route portion that the vehicle 1 is driving along. Thus, the vehicle 1 has the opportunity to react accordingly depending on the type and spatial-temporal extent of the disruption S.

In order to detect the disruption S of the communication connection K between the vehicle 1 and the central computer unit 2 and to react accordingly in relation to the autonomous driving mode of the vehicle 1, a method described below is provided.

A detection of the spatial-temporal communication limitation in the form of the disruption S of the communication connection K is carried out by means of an analysis of an request behavior from vehicles 1 to the central computer unit 2.

Disruptions S can take the form of comparatively long delay times, for example latency of several seconds, bandwidth limitations, i.e., e.g., of a relatively low data transmission rate and/or up to a complete loss of communication capability, in particular in a so-called dead zone.

The method furthermore provides that the locations and times at which requests by these vehicles, i.e., the communication units 6 of these vehicles, have reached the central computer unit 2 are analyzed, i.e., evaluated for a plurality of vehicles that are equipped analogously to the vehicle 1 with a position determination unit 4 and a communication unit 6.

By means of this, the locations of a continuous journey of one of these vehicles at which requests by this vehicle have not reached the central computer unit 2 can be ascertained.

Disruptions S as spatial-temporal communication limitation can be determined on the part of the central computer unit 2 by lacking requests, in particular with cyclically retrieved services, such as traffic services, for example. By means of an analysis which is carried out for all vehicles 1, temporal-spatial locations, i.e., regions, are determined, lacking requests.

In addition or alternatively to the determination of temporal-spatial disruptions S on the part of the central computer unit 2, the vehicle 1 can detect the communication limitation in connection with the location, the date and the time and report this to the central computer unit 2.

In this way, it is possible to also identify dynamic disruptions S of the communication connection K in addition to present and at least partially known disruptions S in the form of dead zones. Such a dynamic disruption S emerges, for example, when a network provider cannot provide sufficient capacity for the number of users, such as in a traffic jam, for example.

A type and spatial extent of a disruption S of the communication connection K between the vehicle 1 and the central computer unit 2 is transmitted to the vehicle 1 being driven in the autonomous driving mode before it reaches the location of the disruption S.

The type and a length of a route portion on which the communication connection K is disrupted constitutes a takeover condition in relation to the driving task of the vehicle 1.

If the length of the route portion with disruption S of the communication connection K between the vehicle 1 and the central computer unit 2 exceeds a predetermined length, then a request is emitted to the vehicle user in vehicle 1 to assume the driving task of the vehicle 1. For example, the predetermined length is 10 km.

If the vehicle user does not meet the request to assume the driving task, the vehicle 1 is automatically brought to a standstill, in particular a safe standstill. A delay of the vehicle 1 until it reaches a standstill can be carried out in such a way that the vehicle 1 is brought to the standstill in its current driving lane. Alternatively, the vehicle 1 is guided onto a far-right driving lane or a hard shoulder of the road and brought to a standstill there.

The autonomous driving mode is continued with at least one changed operating parameter of the vehicle 1 when the length of the route portion on which the communication connection K is disrupted does not meet the predetermined length. The vehicle 1 is thus put into a safety mode.

As the operating parameters for continuing the autonomous driving mode, a maximum driving speed, a safety distance to be observed, a time gap and/or a specification for approving at least one driving maneuver is or are changed.

In particular, one or more operating parameters are changed when data exchange between the vehicle 1 and the central computer unit 2 is not possible for the next 1 km, which the autonomously driving vehicle 1 can be informed about, e.g., via a further broken down vehicle behind a curve.

Before arriving at the location of a disruption S, e.g., entering a dead zone, retrieved information is used with uncertainty corresponding to its age. In particular, this is the age of traffic reports that are used with uncertainty.

Furthermore, the method provides that, before arriving at the location of the disruption S, predicted values, for example the prediction of traffic jams, are retrieved by the autonomously driving vehicle 1 or actively transmitted by the central computer unit 2.

Services that require comparatively high capacities in the communication network are prepared for an imminent communication shortage. Here, the preparation is carried out e.g., by filtering corresponding importance of the information, i.e., data, when collecting map update data, or by reducing the quality when transmitting a video.

Before the vehicle 1 reaches the location of the spatial-temporal disruption S of the communication connection K, limitations valid at least temporarily for the location in relation to the driving mode of the vehicle 1 are transmitted to the vehicle. Such a temporarily valid limitation can be, for example a diesel vehicle ban on a certain road.

The vehicle user of the vehicle 1 is informed about current and/or approaching disruptions S, wherein, to this end, the type and extent of the disruption S is displayed on a display unit of the navigation system 5. For example, the route portion with the disruption S is displayed on a map of the navigation system 5 highlighted in color.

In addition, an embodiment of the method provides that an expected point in time when the communication connection K can be used again without limitation, i.e., without disruption S, is displayed to the vehicle user.

If the autonomously driving vehicle 1 is a hybrid vehicle, the type and extent of the spatial-temporal disruption S of the communication connection K is taken into consideration in an operating strategy, in particular when there is no longer any current traffic jam information.

Driving behavior of autonomously driving vehicles 1 in an area of a limitation, i.e., a disruption S of the communication connection K is regulated in such a way that a present communication capacity is apportioned across all vehicles 1 in the area. For this, the video quality during the data transfer is reduced, the data transfer is curbed and/or filtered and/or a request interval in cyclically retrieved services is increased.

In particular, a digital map is compiled in which, in terms of time, locations with missing vehicle requests are marked, wherein, alternatively or additionally, locations with common repeat requests are marked on the map.

This map can be transmitted as an evaluation to telecommunications companies in order to improve the mobile radio network in the short-term or even in the long-term.

Missing requests recorded by sides of the central computer unit 2 from vehicles 1 are examined as to whether these correlate with traffic jams. If this is the case, then it is predetermined that these vehicles 1 pose requests to the central computer unit 2 with a greater request interval.

This greater request interval is then also used with the further vehicles that reach the respective traffic jam.

The method moreover provides that, with gridlocked traffic in cities, it is ascertained whether problems simultaneously occur with request behavior of the vehicles 1 to the central computer unit 2.

Moreover, an activation of the autonomous driving mode is only approved when the vehicle 1 is on a route portion on which the communication connection K to the central computer unit 2 is undisrupted at least for a predetermined minimum length of the route portion.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:
1. A method, comprising:
operating a vehicle in an autonomous driving mode, wherein the vehicle is operated in the autonomous driving mode by an assistance system of the vehicle;
establishing, between the vehicle and a central computer unit, a communication connection for exchanging data;
determining, by the central computer unit a spatial-temporal disruption of the communication connection by the central computer unit analyzing behavior of requests sent from a plurality of vehicles to the central computer unit;
determining, by the vehicle, whether a takeover condition is satisfied while the vehicle is in the autonomous driving mode and the communication connection is established, wherein the takeover condition is satisfied when it is determined that the communication connection between the vehicle and the central computer unit is disrupted on a route portion exceeding a predetermined length and on which the vehicle is located or which the vehicle is approaching; and modifying operation of the vehicle responsive to the determination that the takeover condition is satisfied.

2. The method of claim 1, wherein an activation of the autonomous driving mode is only approved when the vehicle is on a route portion on which the communication connection to the central computer unit is undisrupted at least for a predetermined minimum length of the route portion.

3. The method of claim 2, wherein the modification of the operation of the vehicle involves continuing the autonomous driving mode with at least one changed operating parameter of the vehicle when the length of the route portion on which the communication connection is disrupted does not meet the predetermined length.

4. The method of claim 3, wherein the at least one changed operating parameter is a maximum driving speed, a safety distance to be observed, or a specification for approving at least one driving maneuver.

5. The method of claim 1, wherein locations and times at which the requests to the central computer unit have reached the central computer unit are evaluated for the plurality of vehicles.

6. The method of claim 1, wherein a type and extent of the spatial-temporal disruption of the communication connection is transmitted to the vehicle before the vehicle reaches a location of the disruption of the communication connection.

7. The method of claim 1, wherein before reaching a location of the spatial-temporal disruption of the communication connection, at least temporarily valid limitations to the driving mode of the vehicle are transmitted to the vehicle.

8. The method of claim 1, further comprising:
informing a vehicle user about a current and/or imminent disruption of the communication connection to the central computer unit.

9. The method of claim 8, wherein the vehicle user is informed by information of the current and/or imminent disruption being emitted at least on a display unit of a navigation system of the vehicle.

10. The method of claim 8, wherein if the vehicle user does not assume operation of the vehicle responsive to the informing of the vehicle user, the modification of the operation of the vehicle involves the assistance system bringing the vehicle to a standstill.

* * * * *